April 22, 1952     D. O. TRANBARGER     2,594,250
WASTE MATERIAL DISPOSAL APPARATUS
Filed Feb. 14, 1949     3 Sheets-Sheet 1

INVENTOR.
Dale O. Tranbarger
BY
Swift & Tuck
ATTORNEYS

April 22, 1952 D. O. TRANBARGER 2,594,250
WASTE MATERIAL DISPOSAL APPARATUS
Filed Feb. 14, 1949 3 Sheets-Sheet 2

INVENTOR.
Dale O. Tranbarger
BY
Smith & Tuck
ATTORNEYS

April 22, 1952     D. O. TRANBARGER     2,594,250
WASTE MATERIAL DISPOSAL APPARATUS
Filed Feb. 14, 1949     3 Sheets-Sheet 3
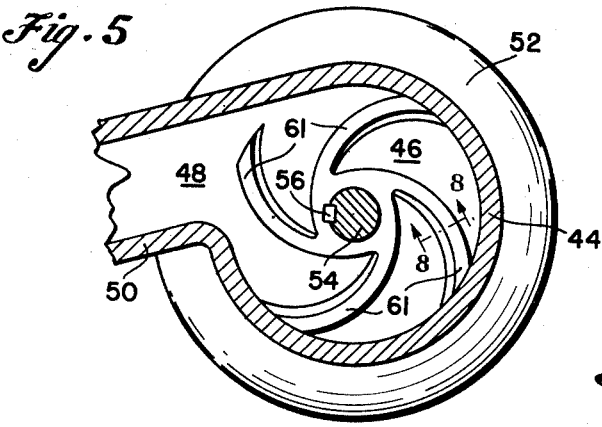
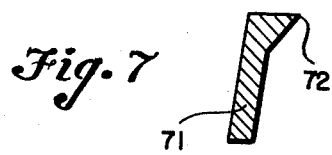
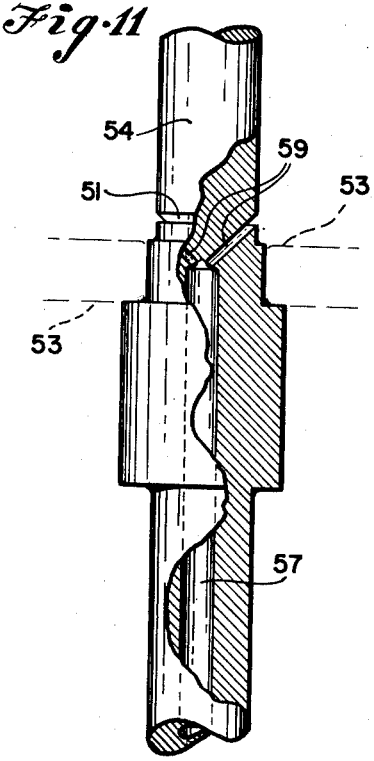
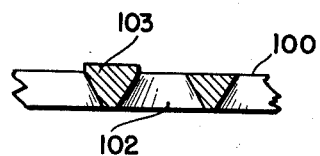
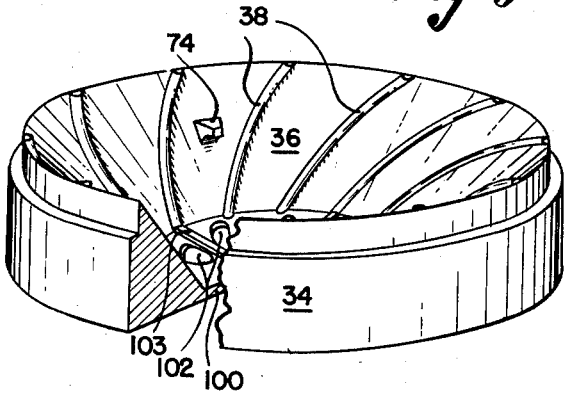
Dale O. Tranbarger
INVENTOR
BY *Smith & Tuck*
ATTORNEYS Patented Apr. 22, 1952

2,594,250

UNITED STATES PATENT OFFICE 2,594,250

WASTE MATERIAL DISPOSAL APPARATUS

Dale O. Tranbarger, Seattle, Wash.

Application February 14, 1949, Serial No. 76,219

2 Claims. (Cl. 241—46)

This invention relates to improvements in a waste material disposal apparatus adapted and arranged to receive material, such as garbage, from a sink or the like to comminute, shred and grind the same in the presence of water to a flowable consistency, and to pressure flush such treated material into a sewage waste conduit for discharge to a sewer system.

Among the important objects of the invention are: the provision of apparatus that reduces to small particle size garbage and the like with more efficiency and the consumption of less power than has previously been possible; the provision, in such an apparatus, of more efficient means for improving the outward flow of the reduced material away from the reducer apparatus to the sewer system; the improvement of the manner in which the reduced material is discharged from the grinding and shredding elements to the pressurizing means operable upon the flowable effluent; to provide means for reducing the feed material to small particles in stages of comminution as distinguished from a single stage reduction whereby less wear and tear occurs in the apparatus and the operation is carried on over an extended period of time to the end that a suitable scouring action is had upon the sewage waste conduit to keep the same clear and open.

These and other objects and advantages of the invention may be comprehended, together with the details of the manner in which the invention is carried out, from the following description taken in connection with the accompanying drawings, in which:

Figure 5 is a sectional view taken on line 5—5 below the reducer chamber and above a pump chamber in which the reduced and flowable material is pressurized for discharge to a sewer system;

Figure 6 is an enlarged cross-sectional view through a material reducing hammer element as indicated by line 6—6 of Figure 1;

Figure 7 is an enlarged sectional view through a blade of an impeller employed in the reduction of material as indicated by line 7—7 of Figure 4;

Figure 8 is an enlarged sectional view across a blade of the pump impeller shown in Figure 5 as suggested by line 8—8 thereof;

Figure 9 is an enlarged sectional view taken on line 9—9 of Figure 4 through a fragment of a ported plate disposed in the outlet of the reduction chamber and above the pump chamber;

Figure 10 is a perspective view of a collar insert which forms the outlet chamber of the comminution portion of my mechanism; and Figure 11 is an enlarged fragmentary view of the motor shaft with portions broken away to disclose its hollow axial passage.

Figure 1:
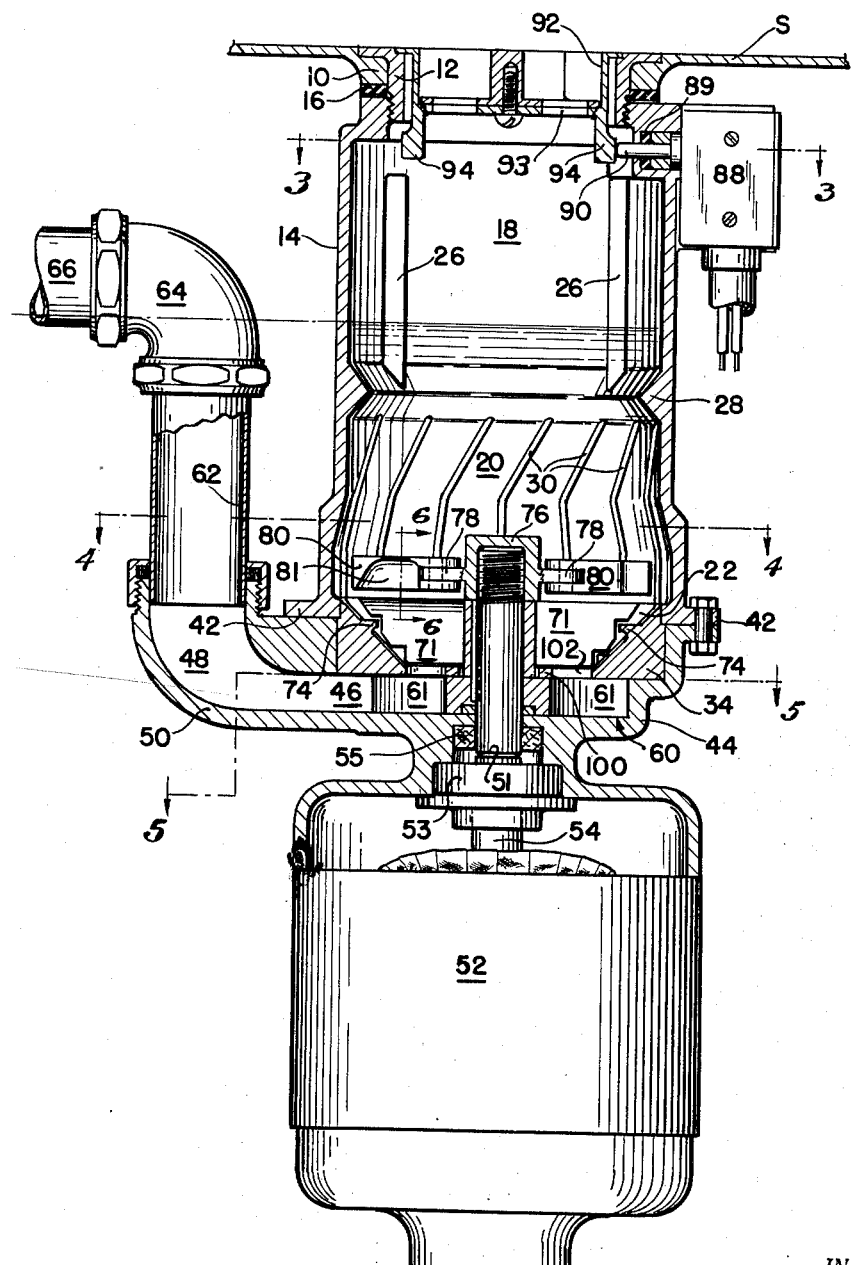
Figure 1 is a side elevational view, partially in section, of a waste disposal apparatus containing the present invention and showing the apparatus disposed between the normal outlet of a sink and sewage waste conduit to receive material from the sink and to reduce it to small sized particles in the presence of water to a flowable consistency.
Figure 2:
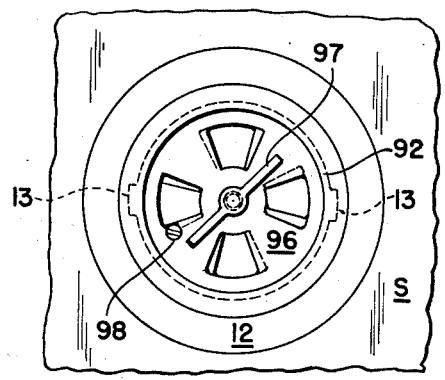
Figure 2 is a plan view of a portion of a sink bottom and the sink outlet to the disposal unit which is mounted therebelow.
Figure 3:
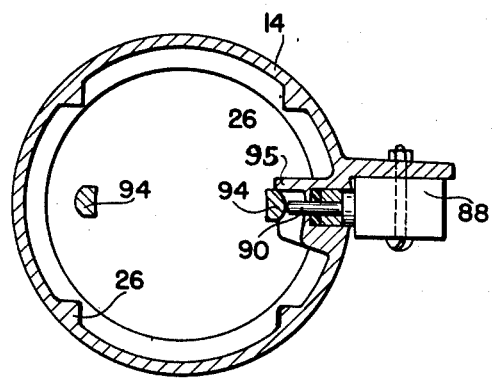
Figure 3 is a sectional view taken on line 3—3 of Figure 1, showing portions of the actuation means employed in operating the control of electric motor that drives the comminution mechanism.

In Figures 1 and 2 of the attached drawings, a bottom portion of sink S is shown as having a downwardly flanged outlet opening 10 in which is seated, from above, the flanged and threaded sleeve 12. A rigid metallic casing 14 is threadedly engaged to the downwardly extending portion of sleeve 12. When the casing is screwed tightly against the gasket 16 that lies between the lower end of the sink flange and the upper end of the casing, a water-tight connection is effected whereby the outward flow of water from the sink S passes directly into the upper chamber portion 18 within the casing.

The cavity within the casing is roughly divided into three portions which are, from above downward, the adit portion 18, the reducer portion 20, and the inverted frusto-conical outlet portion 22.

On the inner faces of the casing walls within the adit chamber portion 18 are outstanding ribs 26 which are radially directed toward the axis of the chamber and which extend vertically approximately parallel to the axis of the chamber. These ribs function to reduce swirling of material, particularly the fluid content, that may be within the casing.

Between the adit chamber portion 18 and the intermediate reducer chamber portion 20 is an annular rib 28 that tends to constrict slightly the passage between the chambers and slightly overhangs the lower reducer chamber portion 22, as shown.

Below the rib 28, the casing wall is cylindrical for a short distance and then flares outward slightly to an enlarged cylindrical area in which comminution is largely performed. A plurality of spaced apart, generally upright projections 30 are provided on the walls forming the reducer chamber portion 24.

Fitted into the lower end of casing 14 is collar 34 which has an upper, inwardly converging face 36 between its upper edge and the openings 102 in its bottom plate 100. A plurality of helically disposed spaced apart ribs 38 is provided to stand out on the sloping face 36 and terminate adjacent the bottom plate 100.

Figure 4:
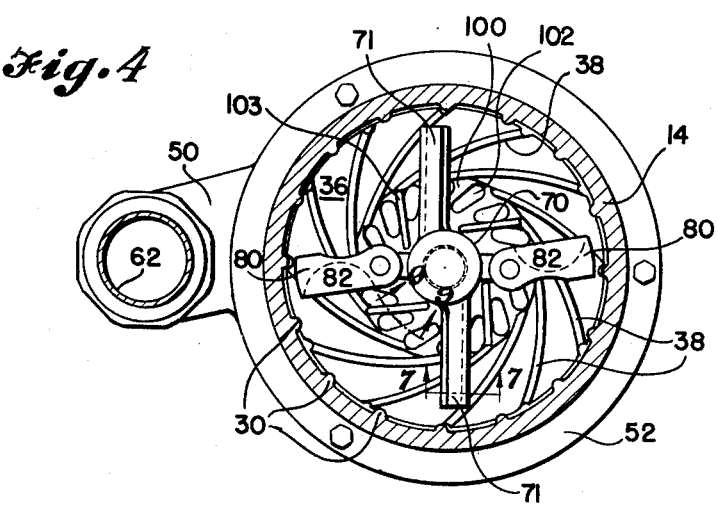
Figure 4 is a sectional view taken on line 4—4 of Figure 1 through the comminution chamber looking down upon the material reducing mechanism.

Mounted on flanges 42 of casing 14 and adapted to receive and support the collar 34 is the pump casing 44 which has inner pump chamber 46 that merges with conduit passage 48 of the lateral arm 50 as is best seen in Figures 1, 4 and 5. Motor housing 52 depends below the pump casing 44 and the electric motor shaft 54 extends upwardly through the pump chamber 46, the lower outlet chamber portion 22 in casing 14, and into the lower part of the reducer chamber 20. Shaft 54 has a longitudinal keyway to receive key 56 that secures the various rotary elements to the shaft.

The multi-bladed pump impeller 60 is secured by key 56 and is located within chamber 46. Preferably the size of the pump impeller is such that, around its hub, material passing from chamber portion 22 is discharged into the pump chamber at the roots of the blades 61 and passes outwardly therealong, due to centrifugal action when the impeller is rotated. The pump impeller blades 61 extend, in chamber 44, beyond the limits of the inlets to the chamber so that as the material passes outward it cannot escape in any other direction than toward the periphery of the pump chamber where it is swept into the discharge conduit 48, thence into riser 62, through elbow 64, and to the sewage conduit 66. As seen in Figure 8, the blades 61 in cross-section are canted.

Also secured to shaft 54 by key 56 is the hub of the bladed impeller 70 that is located within the frusto-conical chamber 22. The ends of the blades 71 of impeller 70 conform generally to the converging wall of chamber portion 22 and, as may be seen in Figure 7, have a pointed overhanging lip 72 on the leading face. Blades 71 are non-radially mounted on the impeller hub and are canted in the direction of rotation so that the lower edge trails the upper edge slightly when the impeller is rotated.

Between pump impeller 60 and the shredding impeller 70 in the bottom wall 100, is a plurality of spaced apart perforations 102 between certain of which is disposed upstanding ribs 103. The fluid passes through the perforations and particles that reach this point still unreduced.

On occasion I employ outstanding bosses 74 on the inner sloping face of collar 34 and the ends of the impeller in such case are notched to clear the bosses when the impeller turns within its chamber.

The upper end of shaft 54 carries for rotation the hub 76 which has outstanding ears 78 thereon on opposite sides. A hammer 80 is mounted on each ear 78 to swing about the vertical axis of pivot pin 82 that couples the hammer element to the ear. The length of each hammer is such that during unobstructed rotation, its outer end just clears the rib projections 30 of the inner wall of chamber 20. On its leading face 81, each hammer is rearwardly sloped downward away from the upper face.

A switch casing 88 is mounted on the upper part of the casing 14 and contains a switch having an outstanding spring pressed actuator pin 90 which passes through casing 14 into the upper part of adit chamber 18. A fluid tight seal is indicated at 89 to prevent leakage around the pin 90.

Refuse cup 92, having bottom perforations 93, fits into sleeve 12 and carries downwardly extending lugs 94 which normally are out of contact with pin 90 but may be brought into pressing engagement therewith upon rotation of the cup 92. A ported valve disc 96 overlies the bottom of cup 92 and serves when suitably rotated to close the cup when it is desired to prevent material passing into the casing 14. The disc 96 is rotated manually by the handle 97 and causes the cup to turn when the valve disc closes the cup openings and downwardly extending screw 98 comes against the edge of a cup opening 93 through which it depends. Movement of the operating lug 94 on the switch is arrested past the switch depressing position by abutting shoulder 95.

Sleeve 12 is notched at 13 oppositely to receive the lugs 94 whose lower ends extend outwardly under the lower edge of sleeve 12 to retain the cup in position against non-desired upward withdrawal from the sleeve.

Below the pump chamber in the motor housing 52, shaft 54 is journalled in bearing 53, above which, in spaced relation, is located the shaft seal 55. The shaft 54 has an axial passage 57 extending from adjacent bearing 53 to its lower end and has a groove 51 in its external face located in the space between the bearing and the shaft seal. Passages 59 extend through the shaft from its hollow interior to the groove to provide drainage of any moisture that may seep through the seal during "off" periods of the mechanism.

Normally water stands in the casing 14 to a height determined by the collateral height of the riser 62 and the sewage conduit 66 as indicated in Figure 1. In this condition the apparatus functions as a trap between the sewer and the sink and prevents the flow of sewer gases and the like to the sink.

Having thus described my invention, I claim:

1. In a mechanism for the comminution of material in the presence of solids, wall means forming a vertical axis grinding passage having an upper inlet and a lower outlet and including an inverted frusto-conical chamber portion immediately above said outlet, spaced apart grinding projections on the inner walls of said inverted frusto-conical portion, a grinding impeller in said frusto-conical chamber portion to whirl material against the walls and projections thereof, means forming a perforate bottom wall in spaced relation below said impeller blades, upstanding ribs on said bottom wall rising to shearing relation with said impeller blades, a centrifugal pump chamber below said lower outlet and in communication with the grinding passage to receive material through said perforate bottom, said chamber being materially larger than said outlet, a pumping impeller in said pump chamber to receive material at its hub and force it from said pump chamber under pressure, said pumping impeller being broader than said perforate bottom, a waste conduit from said pump chamber for the effluent from said mechanism, and electromotive means for rotating said impellers.

2. In a mechanism for the comminution of disposable garbage material in the presence of fluid, wall means forming a vertical axis grinding passage having an upper inlet and a lower outlet and including an inverted frusto-conical chamber immediately above said outlet, spaced apart grinding projections on the inner walls of said inverted frusto-conical chamber, a grinding impeller in said inverted frusto-conical chamber to whirl material against the chamber walls and projections thereof; a centrifugal pump chamber below said lower outlet and in communication with the passage, a multi-bladed rotary impeller in said pump chamber to receive material at its hub through said outlet and force it from said pump chamber under pressure, said multi-bladed impeller being broader than said outlet; a waste discharge conduit from said pump chamber; electro-motive means for rotating said grinding impeller and said multi-bladed rotary impeller; said lower outlet having a ported plate therein below said grinding impeller; and said plate having upstanding ribs between which and the bottom edge of the impeller cooperative shearing of material is accomplished.

DALE O. TRANBARGER.

REFERENCES CITED

The following references are of record in the file of this patent:

UNITED STATES PATENTS

| Number | Name | Date |
|---|---|---|
| 1,174,656 | Beckwith | Mar. 7, 1916 |
| 1,687,886 | Philipp | Oct. 16, 1928 |
| 1,987,941 | Mathews | Jan. 15, 1935 |
| 2,100,020 | Andrews | Nov. 23, 1937 |
| 2,133,756 | Rodgers | Oct. 18, 1938 |
| 2,156,075 | Alexay | Apr. 25, 1939 |
| 2,166,786 | Alexay | July 18, 1939 |
| 2,322,058 | Powers | June 15, 1943 |
| 2,421,014 | Coss et al. | May 27, 1947 |
| 2,428,420 | Green | Oct. 7, 1947 |
| 2,442,812 | Jordan | June 8, 1948 |
| 2,476,630 | Schindler | July 19, 1949 |